United States Patent
Asano et al.

(10) Patent No.: US 6,281,281 B1
(45) Date of Patent: *Aug. 28, 2001

(54) GRANULATED POWDER OF FILLED POLYTETRAFLUOROETHYLENE FOR MOLDING AND PROCESS FOR THE PRODUCTION THEREOF

(75) Inventors: Michio Asano; Tetsuo Shimizu; Shoji Kawachi, all of Settsu (JP)

(73) Assignee: Daikin Industries, Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/068,124

(22) PCT Filed: Nov. 1, 1996

(86) PCT No.: PCT/JP96/03223

§ 371 Date: May 7, 1998

§ 102(e) Date: May 7, 1998

(87) PCT Pub. No.: WO97/17392

PCT Pub. Date: May 15, 1997

(30) Foreign Application Priority Data

Nov. 9, 1995 (JP) .................................................. 7-291174

(51) Int. Cl.⁷ ........................................................ C08J 3/16
(52) U.S. Cl. ......................... 524/546; 524/463; 523/335; 526/247; 528/502 R; 528/502 C
(58) Field of Search ..................................... 524/463, 546; 526/247; 528/502 R, 502 C; 523/335

(56) References Cited

U.S. PATENT DOCUMENTS

| | | | |
|---|---|---|---|
| 3,983,200 | | 9/1976 | Browning . |
| 4,370,436 | * | 1/1983 | Nakamura et al. ................... 524/322 |
| 4,774,304 | * | 9/1988 | Kuhls et al. ........................... 526/247 |
| 4,985,190 | * | 1/1991 | Ishikawa et al. ..................... 264/122 |
| 5,176,958 | * | 1/1993 | Shimizu et al. ...................... 428/402 |
| 5,216,068 | * | 6/1993 | Zipplies ................................ 524/546 |
| 5,676,927 | * | 10/1997 | Nakagami et al. ................. 424/9.32 |

FOREIGN PATENT DOCUMENTS

| | | |
|---|---|---|
| 05287151 | 2/1993 | (EP) . |
| 54-17782 | 7/1979 | (JP) . |
| 56-115326 | 9/1981 | (JP) . |
| 56-54016 | 12/1981 | (JP) . |
| 60-21694 | 5/1985 | (JP) . |
| 61-243851 | 10/1986 | (JP) . |
| 3-255133 | 11/1991 | (JP) . |

* cited by examiner

Primary Examiner—David W. Wu
Assistant Examiner—Ling-Siu Choi
(74) Attorney, Agent, or Firm—Armstrong, Westerman, Hattori, McLeland & Naughton, LLP

(57) ABSTRACT

To provide a filler-containing PTFE granular powder for molding, which has a high apparent density, a small electrostatic charge and excellent flowability and gives a molded article which is free from lowering of tensile strength and elongation and coloring attributable to a surfactant. Also a process for preparing the granular powder is provided. The granulation is carried out by wetting 100 parts by weight of a mixture of a PTFE powder and filler with 30 to 60 parts by weight of an aqueous solution containing an anionic surfactant in a concentration of not less than 10 times and less than 40 times the critical micelle concentration and then applying mechanical force to the mixture.

8 Claims, 1 Drawing Sheet

GRANULATED POWDER OF FILLED POLYTETRAFLUOROETHYLENE FOR MOLDING AND PROCESS FOR THE PRODUCTION THEREOF

TECHNICAL FIELD

The present invention relates to a filler-containing polytetrafluoroethylene granular powder for molding and preparation process thereof.

BACKGROUND ART

With respect to a process for preparing a filler-containing polytetrafluoroethylene (PTFE) granular powder for molding, hitherto there were some processes. For example, JP-B-44-22619 discloses a process for granulating by stirring in water in the presence of an organic liquid, and JP-B-44-22620 discloses a process for granulating by forming a PTFE powder into a slurry with the use of an organic liquid and then tumbling the slurry. However the processes disclosed in those patent publications have problems such that the organic liquid used is inflammable or harmful to human body and further a problem such that equipment cost for carrying out the processes is high.

On the contrary, with respect to a process without using an organic liquid, there is, for example, a process disclosed in JP-A-3-259925, in which a PTFE powder is stirred in water in the absence of an organic liquid. In such a process using water only, since an apparent density of an obtained PTFE granular powder for molding does not become high, post-treatment becomes necessary.

With respect to other process without using an organic liquid, there is, for example, a process disclosed in JP-B-54-17782, in which a PTFE powder is wetted with a specified amount of an aqueous solution containing a volatile nonionic surfactant and then subjected to tumbling. In the process disclosed in that patent publication, a granular powder having a low apparent density and excellent flowability cannot be obtained. Also since much amount of a nonionic surfactant is used and removal of it is difficult, it remains in a molded article, which results in causing problems such that mechanical properties of the molded article are lowered and that the surfactant is decomposed due to heat in a molding step, thereby causing coloring of the molded article.

Further, a process employing an ionic surfactant instead of the above-mentioned nonionic surfactant can be considered. However when a PTFE granular powder obtained by such a process is molded, a residue (for example, a metal salt) of the decomposed ionic surfactant is generated in the sintering step. The residue is difficult to remove, and has been considered to have problems of causing coloring of the molded article and lowering of mechanical properties of the molded article.

Also the PTFE powder is easy to be electrostatically charged, and thus when mixing, stirring and tumbling steps are carried out for granulation, there occurs electrostatic charge of not less than 50 V due to static electricity. Thus electrostatically charged PTFE powder, when molded, adheres to not only a mold die but also a hopper, feeder, etc. due to static electricity, which results in lowering of flowability.

The present inventors have made intensive studies in view of the above-mentioned problems, and as a result, have found that when granulating a PTFE powder and a filler by applying thereto a mechanical force such as tumbling, use of an anionic surfactant in a specified amount can solve the above-mentioned problems.

Namely an object of the present invention is to provide a process for preparing, without necessity of using an organic liquid, a filler-containing PTFE granular powder for molding which has a high apparent density, a small electrostatic charge and excellent powder flowability and gives a molded article which is free from lowering of mechanical properties such as elongation and coloring as mentioned above.

DISCLOSURE OF THE INVENTION

The present invention relates to a process for preparing a filler-containing PTFE granular powder for molding, characterized in that granulation of a PTFE powder and a filler is carried out by wetting 100 parts (part by weight, hereinafter the same) of a mixture of the powder and filler with 30 to 60 parts of an aqueous solution containing an anionic surfactant in a concentration of not less than 10 times and less than 40 times the critical micelle concentration and then applying a mechanical force to the wet mixture.

Further the present invention relates to the filler-containing PTFE granular powder for molding, which is obtained by the above-mentioned process, characterized in that an apparent density of the granular powder is not less than 0.65 g/ml; and flowability of the granular powder is not less than 6 times or an average particle size of the particles in the granular powder is from 400 to 1,000 $\mu$m and an electrostatic charge of the granular powder is not more than 50 V.

BEST MODE FOR CARRYING OUT THE INVENTION

Figure 1:
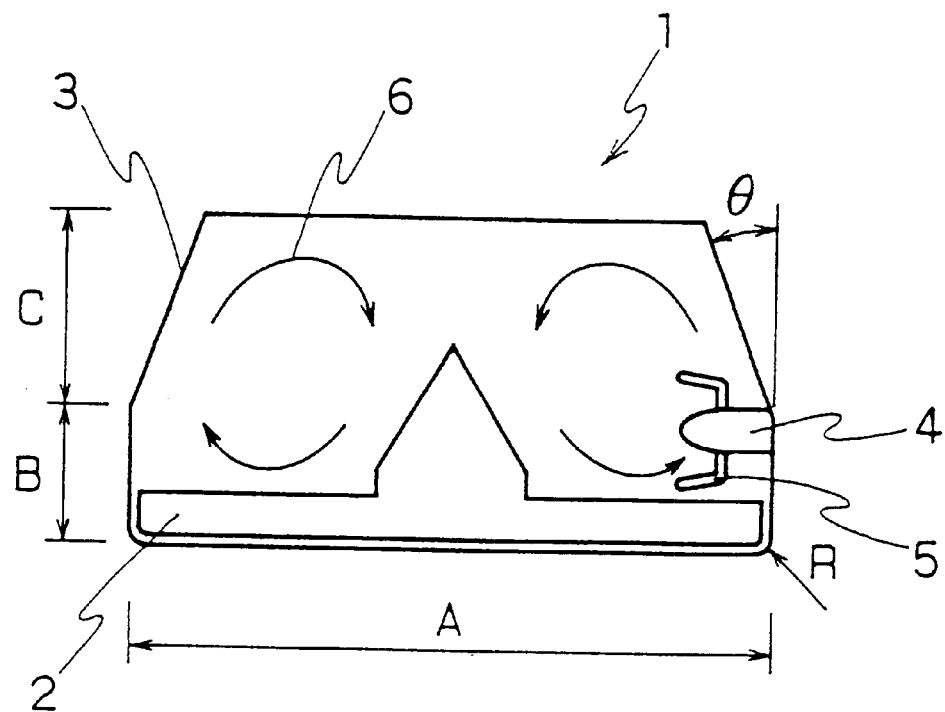
FIG. 1 is a diagrammatical sectional view for explaining a rotating disc type granulator used in the process of the present invention.

A major feature of the process of the present invention is to wet the PTFE powder and filler with an aqueous solution containing an anionic surfactant in a specified amount.

The above-mentioned specified amount means an amount of the anionic surfactant contained in 30 to 60 parts of the aqueous solution based on 100 parts of a sum of the PTFE powder and filler in a concentration of not less than 10 times and less than 40 times the critical micelle concentration, preferably not less than 10 times and less than 20 times the critical micelle concentration.

In the present invention, the meaning of the wetting encompasses such a state that when the aqueous solution containing a surfactant is added to the mixture of the PTFE powder and filler, the PTFE powder and filler get wet and the mixture thereof does not separate from the aqueous solution containing a surfactant.

In the present invention, the critical micelle concentration means a minimum concentration, in which in the aqueous solution containing the anionic surfactant, molecules of the surfactant associate to form a micelle. This concentration can be recognized by a sudden change of a surface tension, etc. of the aqueous solution. In the present invention, the critical micelle concentration is measured through surface tension method at room temperature.

In the present invention, from the point that the PTFE powder and filler are wetted, the critical micelle concentration is used as a standard for determining the amount of the anionic surfactant. By using the anionic surfactant in the above-mentioned specified amount, there can be obtained effects of giving a high apparent density, a small electrostatic charge and excellent flowability to the obtained PTFE granular powder for molding; causing no lowering of tensile strength and elongation of a molded article obtained by molding the granular powder; and causing no coloring attributable to the surfactant.

As the anionic surfactant, there can be used known ones, for example, higher fatty acid and its salt, alkyl sulfate, alkyl sulfonate, alkyl aryl sulfonate, alkyl phosphoric acid ester and the like. Particularly preferable anionic surfactants are a sulfate of higher alkyl alcohol, for example, sodium lauryl sulfate or a fluorine-containing sulfonic acid type- or carboxylic acid type-anionic surfactant having a fluoroalkyl group or chlorofluoroalkyl group. The typical compounds thereof are those represented by the formula (IV):

$$X(CF_2CF_2)_n(CH_2)_mA \quad (IV)$$

or the formula (V):

$$X(CF_2CFCl)_n(CH_2)_mA \quad (V)$$

wherein X is hydrogen, fluorine atom or chlorine atom, n is an integer of 3 to 10, m is 0 or an integer of 1 to 4, A is carboxyl group, sulfonic acid group or an alkali metal or ammonium residue thereof.

Further from the point that a granular powder having a high apparent density can be obtained, examples of preferred anionic surfactant are sodium tetradecene sulfonate, sodium lauryl sulfate and ammonium perfluorooctanoate.

A PTFE powder used in the present invention is a powder prepared by usual suspension polymerization. For example, preferable is a powder comprising a tetrafluoroethylene (TFE) homopolymer or a copolymer of TFE and a monomer copolymerizable therewith. An average particle size of the powder after granulation is not more than 200 μm, preferably not more than 50 μm, and a lower limit thereof is defined by a pulverizing apparatus and pulverizing technique. Examples of such a powder is one having a water content of 0 to 30% by weight after drying.

Examples of the pulverizer used in the above-mentioned pulverization are, for instance, a hammer mill, a grinder having a rotor with blades, a jet mill and an impact mill.

As the moromer copolymerizable with TFE, there are, for example, perfluoro(vinyl ether) represented by the formula (I):

$$CF_2=CF-OR_f \quad (I)$$

wherein $R_f$ is a perfluoroalkyl group having 1 to 10 carbon atoms, a perfluoro(alkoxyalkyl) group having 4 to 9 carbon atoms, an organic group represented by the formula (II):

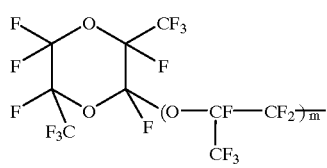

(II)

in which m is 0 or an integer of 1 to 4, or an organic group represented by the formula (III):

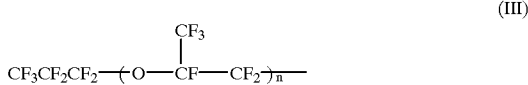

(III)

in which n is an integer of 1 to 4, and the like.

The number of carbon atoms of the above-mentioned perfluoroalkyl group is from 1 to 10, preferably from 1 to 5. When the number of carbon atoms is within the above-mentioned range, an excellent creep resistance can be obtained with maintaining the property of being not-meltprocessable.

As the above-mentioned perfluoroalkyl group, there are, for example, perfluoromethyl, perfluoroethyl, perfluoropropyl, perfluorobutyl, perfluoropentyl, perfluorohexyl and the like. From the viewpoints of creep resistance and cost of monomer, perfluoropropyl is preferable.

When a proportion of the monomer copolymerizable with TFE is within the range of 1.0 to 0.001% by mole, creep resistance of a molded article obtained from the granular powder can be improved.

The use of the above-mentioned PTFE powder containing particles having the average particle size in the above-mentioned range gives such effects that the granular powder obtained through granulation is easily handled, that is, having a small electrostatic charge, good powder flowability and an excellent apparent density, and in addition, the obtained molded articles have good physical properties.

In the present invention, in case where a hydrophilic filler is used, there is a drawback such that the filler is difficult to be mixed with the PTFE powder homogeneously due to its hydrophilic property, that is, the granulated powder in which the whole of the filler used is mixed with the PTFE powder cannot be obtained. This phenomenon is so-called the separation of filler.

To cope with this problem, there is employed a method of previously surface-treating a hydrophilic filler for making it hydrophobic to lower its surface activity near the surface activity of the PTFE powder and then mixing the filler with the PTFE powder.

As the compound known as one used for the above-mentioned surface treatment, there are (a) a functional amino-containing silane and/or a soluble silicone (JP-A-51-548, JP-A-51-549, JP-A-4-218534), (b) a monocarboxylic acid of hydrocarbon having 12 to 20 carbon atoms (JP-B-48-37576), (c) a chromium complex compound of an aliphatic carboxylic acid (JP-B-48-37576), (d) a silicone (JP-A-53-139660), etc. and (e) a method of coating a hydrophilic filler with PTFE (JP-A-51-121417) is also known.

Examples of the above-mentioned compound used for the surface treatement of the hydrophilic filler are, for instance, aminosilane coupling agents such as γ-aminopropyltriethoxysilane ($H_2N(CH_2)_3Si(OC_2H_5)_3$), m- or p-aminophenyltriethoxysilane ($H_2N-C_6H_4-Si(OC_2H_5)_3$), γ-ureidopropyltriethoxysilane ($H_2NCONH(CH_2)_3Si(OC_2H_5)_3$), N-(β-aminoethyl)-γ-aminopropyltrimethoxysilane ($H_2N(CH_2)_2NH(CH_2)_3Si(OCH_3)_3$) and N-(β-aminoethyl)-γ-aminopropylmethyldimethoxysilane ($H_2N(CH_2)_2NH(CH_2)_3SiCH_3(OCH_3)_2$), and the like. In addition to those compounds, there are, for example, organosilane compounds such as phenyltrimethoxysilane, phenyltriethoxysilane, p-chlorophenyltrimethoxysilane, p-bromomethylphenyltrimethoxysilane, diphenyldimethoxysilane, diphenyldiethoxysilane and diphenylsilanediol.

A filler having water-repelling property can be used as it is.

Examples of the above-mentioned filler are, for instance, one or more of metal fiber powder or metal powders such as glass fiber powder, graphite powder, bronze powder, gold powder, silver powder, copper powder, stainless ,teel powder, stainless steel fiber powder, nickel powder and nickel fiber powder; inorganic fiber powder or inorganic powders such as molybdenum disulfide powder, fluorinated mica powder, coke powder, carbon fiber powder, boron nitride powder and carbon black; organic powders such as heat-resistive aromatic resin powder, e.g. polyoxybenzoyl polyester, polyimide powder, tetrafluoroethylene-perfluoro (alkyl vinyl ether) copolymer (PFA) powder and polyphenylene sulfide powder; and the like. The filler is not limited thereto.

In case where two or more fillers are used, preferable combination is, for example, glass fiber powder and graphite powder, glass fiber powder and molybdenum disulfide powder, bronze powder and molybdenum disulfide powder, bronze powder and carbon fiber powder, graphite powder and coke powder, graphite powder and heat-resistive aromatic resin powder, carbon fiber powder and heat-resistive aromatic resin powder or the like. The mixing method may be either of wet method or dry method.

It is preferable that the above-mentioned filler has an average particle size or an average fiber length of 10 to 1,000 $\mu$m.

It is preferable that the proportion of the PTFE powder and the filler is 2.5 to 100 parts, further preferably 5 to 80 parts of the filler on the basis of 100 parts of the PTFE powder.

In the present invention, examples of the method for applying a mechanical force are, for instance, a tumbling method, stirring method, etc.

The tumbling used in this specification means that the PTFE particles containing the filler rotate and move around in the granulator while the particles are rubbing with each other or brought into contact to inner side walls of the granulator. Examples of the granulator used for granulation by tumbling the PTFE powder and filler are, for instance, a rotating disc type granulator, V blender, C blender, granulator with a rotating side plate and a rotating inclined disc, etc.

Figure 2:
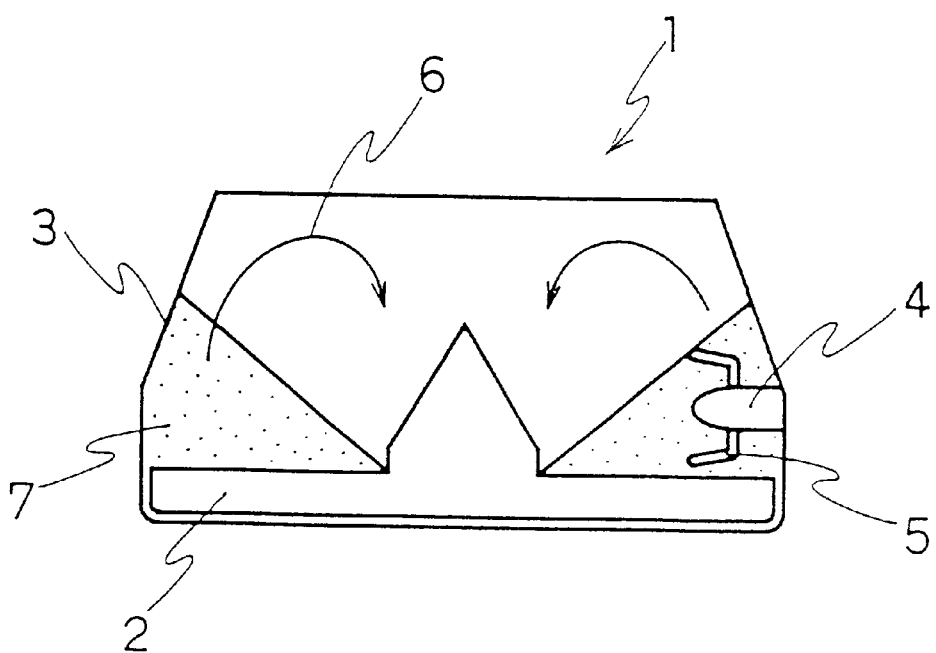
FIG. 2 is a diagrammatical sectional view for explaining a rotating disc type granulator used in the process of the present invention.

FIGS. 1 and 2 are diagrammatical sectional views for explaining rotating disc type granulators which can be used in the process of the present invention.

In FIG. 1, numeral 1 represents a rotating disc type granulator comprising a rotating disc 2, a side plate 3 and a pulverizer 4 with chopper blades 5. The side plate 3 comprises a portion B being at a right angle to the rotating disc 2 and a conical portion C inclined inward at an angle of $\theta$. A represents a diameter of the bottom of the granulator. Well-balanced design of these components can make smooth a flow 6 of the PTFE powder containing the filler. As such a granulator, there is known, for example, High Speed Mixer Model FS-10 available from Fukae Kogyo Kabushiki Kaisha.

The position and size of the pulverizer 4 have great effect on the mixing, tumbling and granulation of the filler and powder. The nearest distance between the chopper blade 5 and the rotating disc 2 is 2 to 3 mm. All of the powders dispersed in a vessel strike on the chopper blades 5 so that an irregular agglomerate produced at the time of the granulation can be pulverized.

When granulating by adding a liquid, since a particle size of the granulated powder is determined by the number of rotations of the pulverizer 4, the pulverizer is of non-stage transmission type by employing an inverter.

Even if the number of rotations of the rotating disc 2 is constant, there is no problem. The number of rotations may be set properly so that the flow 6 of the powder is in good condition as shown in FIG. 2.

In FIG. 2, numerals 1 to 6 are the same as above. Numeral 7 represents a PTFE powder containing a filler.

A peripheral speed of the rotating disc 2 varies depending on kind of the powder. Suitable speed is about 5 to 10 m/second.

Examples of the process for preparing the filler-containing PTFE granular powder for molding of the present invention are, for instance, the following process, etc.

The above-mentioned rotating disc type granulator (capacity: 10 liters) is charged with 600 to 950 g of a PTFE powder and 50 to 400 g of a filler, and the rotating disc and pulverizer are rotated at 600 to 800 rpm and 4,000 to 4,600 rpm, respectively to mix the powder and filler uniformly over 5 to 10 minutes.

Then with the above-mentioned number of rotations being maintained, 400 to 1,500 ml of an aqueous solution containing 0.3 to 1% by weight of an anionic surfactant is added over 2 to 5 minutes and is made compatible with the mixture of the PTFE powder and filler over 0.5 to 3 minutes.

Subsequently the number of rotations of the disc and pulverizer is adjusted to 50 to 800 rpm and 50 to 200 rpm, respectively and further a jacket is steam-heated to heat a product in the granulator to a temperature in the range of 70° to 75° C. over 10 to 30 minutes, followed by tumbling for 0 to 20 minutes for granulation. The granulation carried out in the manner mentioned above makes the apparent density of the granular powder higher and the shape of particles in the powder spherical.

Then the product is taken out and dried at 165° C. for 16 hours in an electric oven to give the filler-containing PTFE granular powder for molding of the present invention.

In the above-mentioned preparation process, the granular powder giving, for example, the following physical properties of the powder and molded article can be obtained.

Apparent density: not less than 0.60 g/ml

Flowability: 6 to 8 times

Average particle size: 400 to 1,000 $\mu$m

Tensile strength: 100 to 400 kgf/cm$^2$

Elongation: 100 to 500%

Electrostatic charge: not more than 50 V

Conditions for the process for preparing the filler-containing PTFE granular powder for molding of the present invention are, for example, as follows.

(A) PTFE powder 100 parts (B) Filler 5 to 40 parts (C) Anionic surfactant

An aqueous solution containing a surfactant in a concentration of 10 to 40 times the critical micelle concentration at 20° C. 30 to 60 parts These conditions are advantageous from the viewpoint of flowability of the granular powder.

More preferable conditions are:

(A1) PTFE powder 100 parts (B1) Glass fiber powder or carbon fiber powder 10 to 30 parts (C1) Ammonium perfluorooctanate An aqueous solution containing ammonium perfluorooctanoate in a concentration of 10 to 20 times the critical micelle concentration at 20° C. 40 to 50 parts Those conditions are advantageous from the viewpoints of an apparent density and particle size distribution of the granular powder.

EXAMPLE

The present invention is then explained by means of Experimental Examples, but is not limited to them.

Experimental Examples 1 to 4 and 7 to 10

A 10-liter rotating disc type granulator (High Speed Mixer Model FS-10 available from Fukae Kogyo Kabushiki Kaisha) was charged with 900 g of a PTFE powder (POLYFLON M-111 available from Daikin Industries, Ltd., modified PTFE, in which 0.1% by mole of perfluoro(propyl vinyl ether) was copolymerized, average particle size after granulation: 25 μm) and 100 g of a carbon fiber powder (pitch type carbon fiber SG-249 available from Osaka Gas Chemical Kabushiki Kaisha). A rotating disc and a pulverizer are rotated at 800 rpm and 4,600 rpm, respectively to mix the powders uniformly for five minutes.

Then while rotating the rotating disc and pulverizer at the above-mentioned respective number of rotations, an aqueous solution containing a surfactant of kind, concentration and amount shown in Table 1 was added over 30 seconds, and was made compatible with the PTFE powder and filler for another five minutes.

Subsequently while rotating the rotating disc at 200 rpm and the pulverizer at 50 rpm, a jacket of the rotating disc type granulator was steam-heated to heat a product in the granulator up to about 70° C. over 20 minutes for granulation.

Then the product was taken out and dried at 165° C. for 16 hours in an electric oven to give a filler-containing PTFE granular powder for molding, and the following tests were carried out.

Apparent density: Measured according to JIS K 6891-5.3.

Flowability: According to the method described in JP-A-3-259925, the granular powder was filled in a hopper and dropped by opening an outlet of the hopper. This was repeated to determine how many times the powder drops spontaneously.

Average particle size and particle size distribution of granular powder:

Standard sieves of 10, 20, 32, 48 and 60 meshes (inch mesh) are placed in that order from the top, and PTFE granular powder is put on the 10 mesh sieve. The sieves are vibrated to drop smaller particles downward through each sieve in order. Then after the ratio of the powder remaining on each sieve is obtained by %, accumulated percentages (ordinate) of each remaining powder to the openings of each sieve (abscissa) are plotted on the logarithmic probability paper, and those points are connected with a line. The particle size, the proportion of which is 50% on that line, is obtained and is regarded as an average particle size. Tensile strength (hereinafter may be referred to as "TS") and elongation (hereinafter may be referred to as "EL"):

A die having an inner diameter of 100 mm is charged with 25 g of powder, and a pressure is applied gradually over about 30 seconds until the final pressure becomes about 500 kg/cm$^2$. Then that pressure is kept for two minutes to give a pre-molded article. The pre-molded article is taken out of the die mold and put in an electric oven being kept at 365° C. to be subjected to sintering for three hours. Then the sintered article is punched with a JIS dumbbell No. 3 to give a sample. A stress at break and elongation of the sample are measured in accordance with JIS K 6891-58 by stretching at a stretching rate of 200 mm/min with an autograph having a gross weight of 500 kg.

Electrostatic charge: Handy Electrostatic Meter SFM775 available from Ion Systems, Inc. is used to determine an electrostatic charge.

The results are shown in Table 1.

Experimental Examples 5 and 6

A filler-containing PTFE granular powder for molding was prepared in the same manner as in Experimental Example 1 except that 850 g of a PTFE powder was used, 150 g of a glass fiber powder (EPG40M-10A available from Nippon Denki Glass Kabushiki Kaisha, average diameter: 12 μm, average fiber length: 80 μm) treated previously for water repelling with an amino silane coupling agent was used instead of the carbon fiber powder, and kind, concentration and amount of surfactants shown in Table 1 were used. The tests were carried out in the same manner as in Experimental Example 1. The results are shown in Table 1.

TABLE 1

| | Experimental Examples | | | | | | | | | |
|---|---|---|---|---|---|---|---|---|---|---|
| | 1 | 2 | 3 | 4 | 5 | 6 | 7 | 8 | 9 | 10 |
| Kind of filler | Carbon fiber powder | Carbon fiber powder | Carbon fiber powder | Carbon fiber powder | Glass fiber powder | Glass fiber powder | Carbon fiber powder | Carbon fiber powder | Carbon fiber powder | Carbon fiber powder |
| Surfactant | | | | | | | | | | |
| kind | SOS | SOS | SLS | SLS | DS-101 | DS-101 | HS-210 | HS-210 | SOS | SLS |
| Concentration in aqueous solution: A (% by weight) | 0.75 | 1 | 0.3 | 0.75 | 0.5 | 1 | 0.4 | 1 | 6.5 | 2 |
| Critical micelle concentration: B (% by weight) | 0.065 | 0.065 | 0.02 | 0.02 | 0.04 | 0.04 | 0.01 | 0.01 | 0.065 | 0.02 |
| A/B (times) | 11.5 | 15.4 | 15.0 | 37.5 | 12.5 | 25.0 | 40.0 | 100.0 | 100.0 | 100.0 |
| Amount of aqueous solution (ml) | 400 | 400 | 400 | 400 | 400 | 400 | 1500 | 600 | 400 | 400 |
| Content in aqueous solution (g) | 3.0 | 4.0 | 1.2 | 3.0 | 2.0 | 4.0 | 6.0 | 6.0 | 26.0 | 8.0 |
| Apparent density (g/ml) | 0.710 | 0.750 | 0.712 | 0.732 | 0.812 | 0.832 | 0.579 | 0.598 | 0.713 | 0.698 |
| Flowability (times) | 8 | 8 | 8 | 8 | 8 | 8 | 2 | 3 | 8 | 8 |

TABLE 1-continued

|  | Experimental Examples | | | | | | | | | |
|---|---|---|---|---|---|---|---|---|---|---|
|  | 1 | 2 | 3 | 4 | 5 | 6 | 7 | 8 | 9 | 10 |
| Particle size distribution (% by weight) | | | | | | | | | | |
| 10 on | 16.8 | 18.0 | 12.3 | 15.2 | 4.1 | 4.7 | 3.1 | 3.6 | 27.4 | 26.2 |
| 20 on | 20.4 | 21.0 | 17.6 | 18.9 | 23.5 | 27.0 | 12.6 | 20.5 | 29.5 | 28.1 |
| 32 on | 43.5 | 43.8 | 44.2 | 43.7 | 48.2 | 54.4 | 36.6 | 53.9 | 28.0 | 30.5 |
| 48 on | 18.5 | 16.6 | 25.2 | 21.6 | 22.9 | 12.2 | 34 | 20.7 | 11.2 | 14.2 |
| 60 on | 0.8 | 0.7 | 0.7 | 0.6 | 0.9 | 0.7 | 10.9 | 1.1 | 4.0 | 1.1 |
| 60 pass | 0.0 | 0.0 | 0.0 | 0.0 | 0.5 | 0.6 | 2.8 | 0.2 | 0.0 | 0.0 |
| Average particle size of granulated PTFE powder ($\mu$m) | 740 | 760 | 690 | 720 | 680 | 730 | 520 | 680 | 1050 | 970 |
| TS (kgf/cm$^2$) | 192 | 197 | 203 | 201 | 206 | 210 | 188 | 182 | 75 | 156 |
| EL (%) | 282 | 283 | 283 | 285 | 295 | 290 | 275 | 273 | 98 | 175 |
| Z value (coloring) | — | — | — | — | 90.2 | 90.5 | — | — | — | — |
| Electrostatic charge (V) | 0 | 0 | 0 | 0 | 20 | 10 | 0 | 0 | 0 | 0 |

In Table 1, abbreviations representing kinds of surfactants are as follows.

SOS: Sodium tetradecene sulfonate

SLS: Sodium lauryl sulfate

DS-101: Ammonium perfluorooctanoate

HS-210: Polyoxyethylnoylphenol containing 10 moles of ethylene oxide per 1 mole of nonylphenol In the column of the particle size distribution of Table 1, 10 on, 20 on, 32 on, 48 on and 60 on indicate the percentage of particles remaining on the 10 mesh, 20 mesh, 32 mesh, 48 mesh and 60 mesh sieves, respectively. And, 60 pass represents the percentage of the particles which passed through the 60 mesh sieve.

In Table 1, Z value (coloring) was measured through the following method.

A method for measuring Z value (coloring):

A 50 mm diameter die was filled with 200 g of a granular powder and then maintained at a molding pressure of 500 kgf/cm$^2$ for five minutes. The obtained pre-molded article (diameter: about 50 mm, height: about 50 mm) was heated up from room temperature to 365° C. at a temperature raising rate of 50° C./hr. After having been maintained at 365° C. for 5.5 hours, the pre-molded article was cooled at a cooling rate of 50° C./hr and then the molded article was cut crosswise with a lathe at the point about 25 mm from its end (at its center portion). Then a Z value on the center of the cut portion was measured by the Z value measuring method of the XYZ calorimetric system of Commission International de Leclairage.

Experimental Examples 11 and 12

A 6-liter Irich Reverse Flow Type High Speed Mixer Model RO2 being available from Nippon Irich Co., Ltd. and used as a granulator with a rotating side plate and a rotating inclined disc (angle of a bottom disc to a horizontal level: 30 degrees) was charged with 1,080 g of a PTFE powder (PLYFLON M-111 available from Daikin Industries, Ltd., modified PTFE, in which 0.1% by mole of perfluoro(propyl vinyl ether) was copolymerized, average particle size after granulation: 25 $\mu$m) and 120 g of a carbon fiber powder (pitch type carbon fiber SG-249 available from Osaka Gas Chemical Kabushiki Kaisha), followed by mixing uniformly for five minutes while rotating the side plate of the mixer and an agitator at 1,000 rpm, respectively.

Then an aqueous solution containing a surfactant shown in Table 2 was added in an amount shown in Table 2. While maintaining the above-mentioned number of rotations, the aqueous solution containing a surfactant was made compatible with the powders for five minutes.

Subsequently the number of rotations of the side plate and agitator was maintained at 1,000 rpm and 450 rpm, respectively, and a jacket was steam-heated for 20 minutes to heat a product in the mixer up to 70° C. for granulation.

Then the product was taken out and dried at 165° C. for 16 hours to give a PTFE granular powder for molding. After weighing the product (hereinafter referred to as "obtained weight"), the tests were carried out in the same manner as in Example 1. Yield was calculated in the manner mentioned below.

Yield: A ratio of the obtained weight to the sum of the PTFE powder and filler which were charged in the granulator was represented by a weight percentage.

The results are shown in Table 2.

Experimental Examples 13 and 14

A PTFE granular powder for molding was prepared in the same manner as in Experimental Example 11 except that 1,020 g of the PTFE powder was used, 180 g of a glass fiber powder (EPG40M-10A available from Nippon Denki Glass Kabushiki Kaisha, average diameter: 12 $\mu$m, average fiber length: 80 $\mu$m) was used instead of the carbon fiber powder, and kind, concentration and amount of surfactants shown in Table 2 were used. After determining the obtained weight, the tests were carried out in the same manner as in Experimental Example 11. The results are shown in Table 2.

TABLE 2

| | Experimental Examples | | | |
|---|---|---|---|---|
| | 11 | 12 | 13 | 14 |
| Kind of filler | Carbon fiber powder | Carbon fiber powder | Glass fiber powder | Glass fiber powder |
| Surfactant | | | | |
| kind | SOS | SOS | DS-101 | DS-101 |
| Concentration in aqueous solution: A (% by weight) | 0.75 | 1.00 | 0.50 | 1.00 |
| Critical micelle concentration: B (% by weight) | 0.065 | 0.065 | 0.04 | 0.04 |
| A/B (times) | 11.5 | 15.4 | 12.5 | 25.0 |
| Amount of aqueous solution (ml) | 480 | 480 | 480 | 480 |
| Content in aqueous solution (g) | 3.6 | 4.8 | 2.4 | 4.8 |
| Apparent density (g/ml) | 0.745 | 0.805 | 0.843 | 0.863 |
| Flowability (times) | 8 | 8 | 8 | 8 |
| Particle size distribution (% by weight) | | | | |
| 10 on | 2.9 | 2.4 | 1.8 | 0.2 |
| 20 on | 12.8 | 30.2 | 26.8 | 23.3 |
| 32 on | 36.5 | 55.2 | 43.3 | 43.4 |
| 48 on | 34.1 | 10.9 | 22.9 | 26.2 |
| 60 on | 11.1 | 0.6 | 5.3 | 6.8 |
| 60 pass | 2.2 | 0.6 | 0.0 | 0.0 |
| Average particle size of granulated PTFE powder (μm) | 520 | 740 | 670 | 630 |
| Obtained weight (g) | 1173 | 1180 | 1178 | 1188 |
| Yield (%) | 97.8 | 98.3 | 98.2 | 99.0 |
| TS (kgf/cm²) | 195 | 196 | 212 | 211 |
| EL (%) | 284 | 285 | 301 | 304 |
| Z value (coloring) | — | — | 91.0 | 91.2 |
| Electrostatic charge (V) | 0 | 0 | 20 | 10 |

In Table 2, the abbreviations representing kind of the surfactants and symbols in the column of particle size distribution are the same as in Table 1. Also in Table 2, a method for measuring Z values (coloring) is the same as in Table 1.

As it is clear from the results shown in Tables 1 and 2, the filler-containing PTFE granular powder for molding, which was prepared by using a specified amount of an anionic surfactant, has a high apparent density, a small electrostatic charge and excellent flowability and can give a molded article which causes no lowering of tensile strength and elongation and is free from coloring attributable to the surfactant. Use of a rotating disc type granulator, particularly a granulator with a rotating side plate and a rotating inclined disc as means to apply mechanical force can give a granular powder containing only a small number of coarse particles.

INDUSTRIAL APPLICABILITY

The filler-containing PTFE granular powder for molding of the present invention has a high apparent density, a small electrostatic charge and excellent flowability, and a molded article obtained from the granular powder causes no lowering of tensile strength and elongation and is free from coloring attributable to the surfactant.

The preparation process of the present invention can provide the filler-containing PTFE granular powder for molding which has mechanical properties mentioned above, and further since an amount of an anionic surfactant used is small, there is no case where it remains in the molded article and has adverse effect on the molded article. Also no post-treatment is necessary, and further since no organic liquid is required to be used, there is no danger of fire. In addition, the granular powder can be obtained at low cost.

What is claimed is:

1. A process for preparing a filler-containing polytetrafluoroethylene granular powder for use of molding by granulating polytetrafluoroethylene powder and a filler, said process comprising the steps of:

first 100 parts by weight of a mixture of the polytetrafluoroethylene powder and the filler are wetted before granulation, with 30 to 60 parts by weight of an aqueous solution containing an anionic surfactant in a concentration of not less than 10 times and less than 40 times the critical micelle concentration in a granulator, then the wetted mixture is granulated by applying a mechanical force to prepare a wetted granular powder having spherical particles and the wetted granular powder is taken out from the granulator.

2. The process for preparing a filler-containing polytetraffluoroethylene granular powder for molding of claim 1, wherein the method for applying the mechanical force is a tumbling method.

3. The process for preparing a filler-containing polytetrafluoroethylene granular powder for molding of claim 1, wherein the anionic surfactant is sodium tetradecene sulfonate, sodium lauryl sulfate or ammonium perfluorooctanoate.

4. The process for preparing a filler-containing polytetrluoroethylene granular powder for molding of claim 1, wherein the polytetrafluoroethylene is a modified polytetrafluoroethylene prepared by copolymerizing 99 to 99.999% by mole of tetrafluoroethylene with 1 to 0.001% by mole of perfluoro(vinyl ether) represented by:

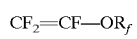

(I)

wherein $R_f$ is a perfluoroalkyl group having 1 to 10 carbon atoms, a perfluoro(alkoxyalkyl) group having 4 to 9 carbon atoms, an organic group represented by the formula (II):

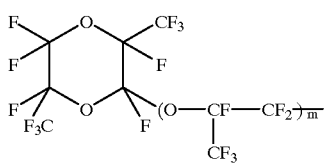
(II)

wherein m is 0 or an integer of 1 to 4, or an organic group represented by the formula (III):

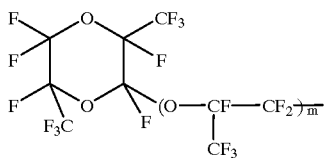
(II)

wherein n is an integer of 1 to 4.

5. The process for preparing a filler-containing polytetrafluoroethylene granular powder for molding of claim 2, wherein the anionic surfactant is sodium tetradecene sulfonate, sodium lauryl sulfate or ammonium perfluorooctanate.

6. The process for preparing a filler-containing polytetrafluoroethylene granular powder for molding of claim 2, wherein the polytetrafluoroethylene is a modified polytetrafluoroethylene prepared by copolymerizing 99 to 99.999% by mole of tetrafluoroethylene with 1 to 0.001% by mole of perfluoro(vinyl ether) represented by:

(I)

wherein $R_f$ is a perfluoroalkyl group having; 1 to 10 carbon atoms, a perfluoro(alkoxyalkyl) group having 4 to 9 carbon atoms, an organic group represented by the formula (II)

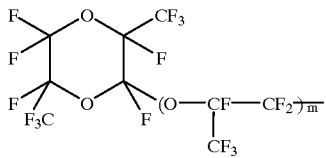
(II)

wherein m is 0 or an integer of 1 to 4, or an organic group represented by the formula (III):

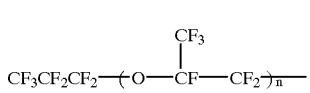
(III)

wherein n is an integer of 1 to 4.

7. The process for preparing a filler-containing polytetrafluoroethylene granular powder for molding of claim 3, wherein the polytetrafluoroethylene is a modified polytetrafluoroethylene prepared by copolymerizing 99 to 99.999% by mole of tetrafluoroethylene with 1 to 0.001% by mole of perfluoro(vinyl ether) represented by:

(I)

wherein $R_f$ is a perfluoroalkyl group having 1 to 10 carbon atoms, a perfluoro(alkoxyalkyl) group having 4 to 9 carbon atoms, an organic group represented by the formula (II):

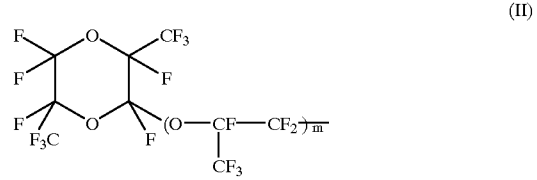
(II)

wherein m is 0 or an integer of 1 to 4, or an organic group represented by the formula (III):

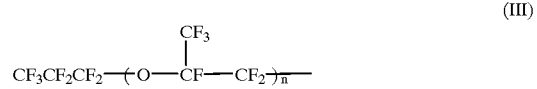
(III)

wherein n is an integer of 1 to 4.

8. The process for preparing a filler-containing polytetrafluoroethylene granular powder for molding of claim 5, wherein the polytetrafluoroethylene is a modified polytetrafluoroethylene prepared by copolymerizing 99 to 99.999% by mole of tetrafluoroethylene with 1 to 0.001% by mole of perfluoro(vinyl ether) represented by:

(I)

wherein $R_f$ is a perfluoroalkyl group having 1 to 10 carbon atoms, a perfluoro(alkoxyalkyl) group having 4 to 4 carbon atoms, an organic group represented by the formula (II)

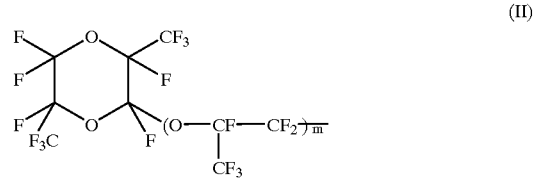
(II)

wherein m is 0 or an integer of 1 to 4, or an organic group represented by the formula (III):

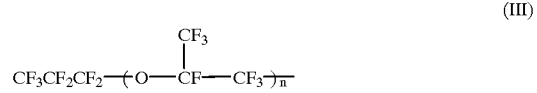
(III)

wherein n is an integer of 1 to 4.

* * * * *